United States Patent [19]

Meyer

[11] 4,413,166

[45] Nov. 1, 1983

[54] DISCONNECT SWITCH

[75] Inventor: Jeffry R. Meyer, Penn Hills, Pa.

[73] Assignee: Westinghouse Electric Corp., Pittsburgh, Pa.

[21] Appl. No.: 245,489

[22] Filed: Mar. 19, 1981

[51] Int. Cl.³ ............................................. H01H 33/60
[52] U.S. Cl. ............................. 200/148 B; 200/148 F
[58] Field of Search ......................... 200/148 B, 148 F

[56] References Cited

U.S. PATENT DOCUMENTS

| | | | |
|---|---|---|---|
| 3,562,460 | 2/1971 | Koerner | 200/148 B |
| 3,806,682 | 4/1974 | Mauthe et al. | 200/148 B |
| 4,029,923 | 6/1977 | Meyer et al. | 200/148 B |

Primary Examiner—Robert S. Macon
Attorney, Agent, or Firm—M. S. Yatsko

[57] ABSTRACT

A disconnect switch and grounding apparatus therefor particularly adapted for use in gas insulated substations. The disconnect switch comprises a chamber having a pair of electrical conductors entering the chamber. Supporting the conductors and insulating them from contact with the chamber itself are insulators, which may be sealingly placed so as to prohibit the escape of the gas. A fixed contact member electrically attached to the first of the pair of conductors and a movable contact member is electrically attached to the second pair of conductors. A movement mechanism to move the movable contact members so as to make and break contact with the fixed contact member. A grounding strip electrically attached to the movable contact member, positioned so as to come in contact with the chamber wall immediately after the breaking of contact between the fixed and the movable contact members. The movement mechanism comprises a linkage having two links, the first link attached at one end to the movable contact member and the other end connected to the second link, the other end of the second link being connected to a shaft member. The shaft member sealingly extends through the wall of the chamber having attached to it on the outside of the chamber a handle for causing the shaft to rotate. The shaft upon rotation engages the linkage causing the movable contact member to make or break contact with the fixed contact member and respectively the ground strip to move away from or come in contact with the wall of the chamber.

9 Claims, 4 Drawing Figures

OPEN POSITION

CLOSED POSITION

OPEN POSITION

DISCONNECT SWITCH

BACKGROUND OF THE INVENTION

This invention relates generally to switching apparatus and more particularly to a disconnect switch and ground strip therefor particularly adapted for use with gas insulated power systems.

In recent years, there has come about a demand for a reduced-size substation. This demand on the part of public utilities has been met by gas insulated substation equipment. This type of substation equipment significantly reduces the space required by the high voltage value of substations rated, for example, 46 Kv through 500 Kv. Space reduction is accomplished by replacing the open-bus and the air-tight bushings with gas insulated bus filled, for example, with a highly insulating gas such as sulfur hexafluoride gas at a pressure, for example, of 45 pounds per square inch gauge and thereby permitting the movement of electrical equipment very closely together.

This gas insulated substation equipment has many advantages, among which are: significant reduction in size requirements both in land area and overall height; added system reliability by eliminating the possibility of phase-to-phase fault, lighting strikes within the system, or contamination of insulators; reduced maintenance because the closed system is isolated from the environment; added personnel safety because all live parts are covered by ground shields; and lower installation costs as compared with conventional or other types of power systems when the gas insulated modular approach is utilized.

The gas insulating system, as briefly described above, has additional design strategies, inasmuch as the high voltage equipment is compressed, so that both the space required and the total length is minimized. The power transformers may be located on outside corners so as to be capable of ready removal, and the location of cable pot heads is flexible, with results that the system may be readily connected to overhead transmission lines.

It is desirable to provide a disconnect switch which will permit the isolation of certain sections of the gas insulator system regarding such a scheme, reference can be had, for example to U.S. Pat. Nos. 4,107,498—Disconnect Switch and Drive Mechanism Therefor, issued Aug. 15, 1978 to Golota, assigned to the assignee of the present invention; 3,987,260—Ground and Test Connection for $SF_6$ Insulated Bus, issued Oct. 19, 1976 to Wilson; 3,876,846—Combination Ground and Test Switch Apparatus for Pressurized-Gas-Insulated High Voltage Systems, issued Apr. 8, 1975 to Graybill; 3,610,858—Disconnect Device for Fully Insulated High-Voltage Electrical Switch Gear With Individually Reciprocal Contacts, issued Oct. 5, 1971 to Mannheim et al. The named patents teach different methods of engaging or disengaging contacts or the grounding of contacts for isolation and test purposes which are required by electrical standards.

It would be advantageous however, to provide a means which is less complex and less expensive to produce. It would also be desirable to provide a grounding means so that upon the opening of the switch, a portion of the high voltage system can be both electrically isolated and electrically neutralized thereby providing a safe working condition.

SUMMARY OF THE INVENTION

Briefly stated, the disconnect switch of this invention comprises a sealed chamber containing an insulating gas and having a pair of electrical conductors each entering from an end of the chamber and an insulating means supporting the conductors, where seals are placed so as to prohibit the escape of the gas. A fixed contact member is electrically attached to the first of said pair of electrical conductors. A movable contact member is electrically attached to the second of the pair of electrical conductors, and capable of being in two positions: one position in contact with the fixed contact member to permit the flow of electric current therebetween; and the other being displaced away from the fixed contact member prohibiting the flow of electrical current therebetween. A drive means is used to facilitate the making and breaking of contact between the contact members including a linkage having a first link connected to the movable contact member and a second link being connected to a rotatable shaft. The shaft is sealingly extended through the wall of the chamber having a lever attached to the end to facilitate shaft rotation. The movable contact member also has a ground strip electrically attached and is positioned so that upon full retraction of the movable contact member the ground strip comes in contact with the electrically grounded chamber wall.

BRIEF DESCRIPTION OF THE DRAWINGS

Reference is now made to the description of the preferred embodiment, illustrated in the accompanying drawings in which.

DESCRIPTION OF THE PREFERRED EMBODIMENT

Figure 1:
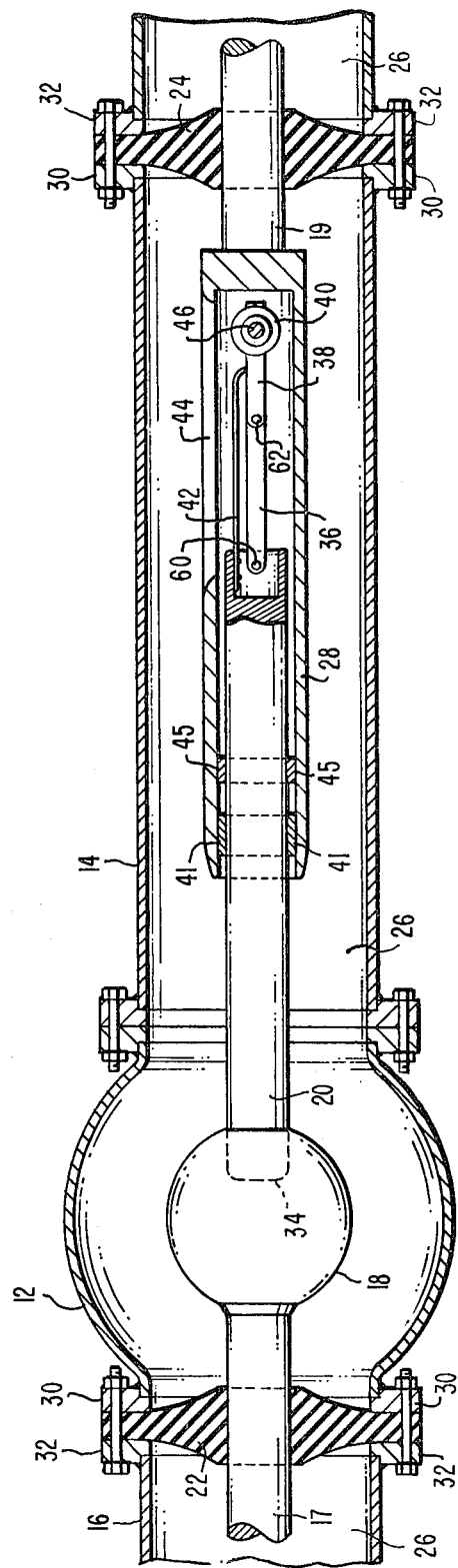
FIG. 1 is a longitudinal, side, sectional view taken through the switch apparatus, illustrated in its closed position.

Referring now to the drawings and in particular to FIG. 1, the disconnect switch comprises an electrically grounded chamber 12 having connected to it a bus structure or sheath 16 and a switch housing 14. Although described in two sections 14, 16 it is to be understood that the two sections together may, for example, comprise a single-phase run of a three-phase electrical distribution system. Entering the chamber 12 and enclosed by a sheath 16 is a first electrical conductor 17 and entering the housing 14 is a second electrical conductor 19. Supporting as well as insulating the conductors 17, 19 are insulators 22, 24 respectively, which are held between flanges 30, 32. Disposed within the interconnected distribution system is an electrically insulating gas 26 such as sulfur hexafluoride which is pressurized in the distribution system at a suitable pressure, such as 45 PSI gauge.

A fixed contact member 18 is within the chamber 12 and is rigidly and electrically attached to the conductor 17. The opening 34 formed in the fixed contact member 18, is equipped with spring biased contact fingers to make sliding contact with the movable contact member 20 therein. A first linkage 36 is attached at one end to the movable contact member 20 by any suitable means such as a retaining pin 60, which permits the linkage to rotate about the attachment means, and at the other end one end of a second linkage 38 attached in the same manner 62 as between the first link 36 and the movable contact member 20, such as a retaining pin. The other end of the second linkage 38 is rigidly attached to a rotatable control shaft coupling means 40 by any suitable means, such as screws. Attached to the movable contact member 20 is a ground strip means 42.

Figure 2:
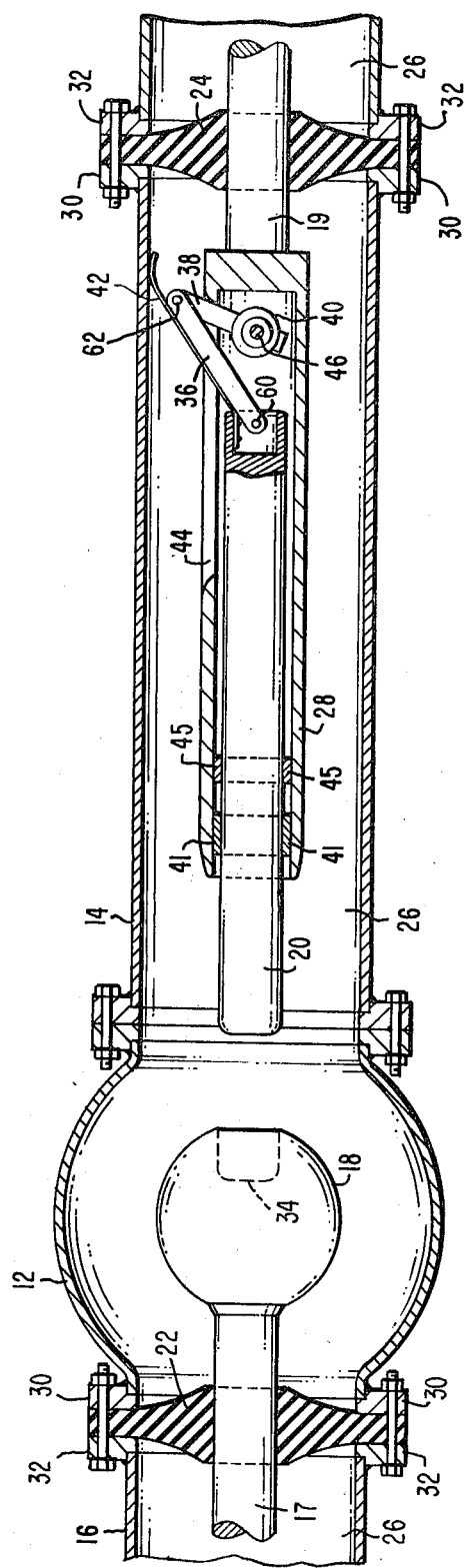
FIG. 2 is a longitudinal, side, sectional view taken through the switch apparatus, illustrated in its open position.

Referring now to FIG. 2 the movable contact member 20 is spaced apart from the fixed contact member 18. A rotational movement of the control shaft coupling means 40 causes a pivotal movement of linkage 38 and 36 through a slot 44 in the movable contact member guide housing 28 thereby causing an essentially straight line displacement of movable contact member 20. The movable contact member 20 is positioned in its displacement by a guide 41 which is attached to the movable contact member guide housing 28. Spring bias contact fingers 45 are electrically attached to the movable contact member guide housing 28 and are in electrical contact with the movable contact member 20 at all times, thereby providing electrical communication between the electrical conductor 19 and the movable contact member 20 through the electrically conductive movable contact member guide housing 28. The ground strip means 42 is urged upward by the linkages 36, 38 through a slot 44 in the movable contact member guide housing 28 and held in electrical contact with the inner wall switch housing 14.

Figure 3:
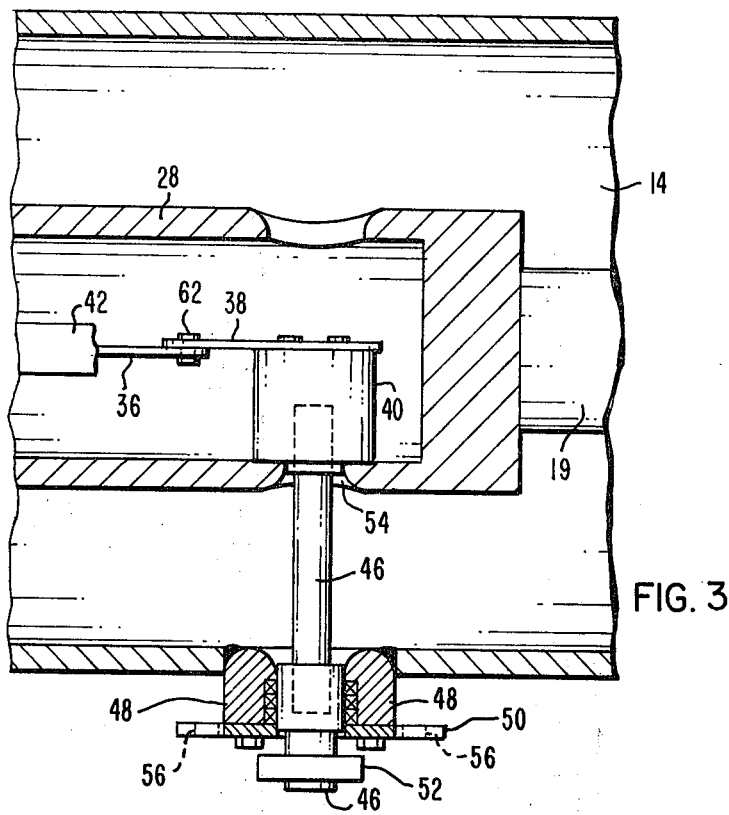
FIG. 3 is a sectional view of the drive mechanism utilized in the invention.
Figure 4:
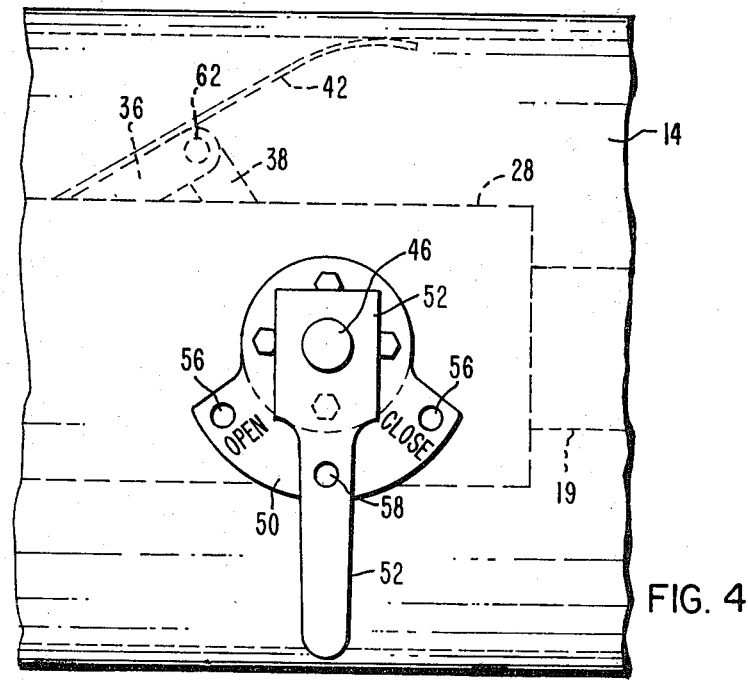
FIG. 4 is an exterior view of the operating means for the drive mechanism utilized in the invention.

Referring now to FIGS. 3 and 4 a rotatable control shaft 46 is rigidly attached to an insulating rotatable control shaft coupling means 40 through an opening 54 in the movable contact member guide housing 28. The rotatable control shaft 46 is sealingly extended through an opening in the switch housing wall 14 through a locking plate 50 and is rigidly attached to a powering means 52. Rigidly attached to the outside wall of the switch housing 14 are locking plate stand-offs 48 which have mounted to them a locking plate 50. A powering means 52 rigidly attached to the rotatable control shaft 46 has an opening 58 which when aligned with a similarly sized opening 56 in the locking plate 50, corresponding to the open or closed position of the disconnect switch, facilitates the use of a mechanism, such as a combination lock, to prohibit the accidental or unintentional opening or closing of contacts in the disconnect switch.

The opening of the disconnect switch is as follows. The powering means 52 causes a rotation of the rotatable control means 46. The rotatable control means 46 which is rigidly attached to the rotatable control means coupling 40 causes the rigidly attached linkage 48 to rotate in the direction of the rotatable control means 46. The linkage 38 causes the attached linkage 36 to pivot up through an opening 44 in the movable contact member guide means 28 which in turn causes the movable contact member 20 to be longitudinally displaced in an essentially straight line manner thereby disengaging the movable contact member 20 from the spring bias contact fingers in the opening 34 of the fixed contact member 18. The pivoting of the linkages 38, 36 in cooperation with the displacement of the movable contact member 20 causes the ground strip means 42 to move essentially upward in a curved manner until rotation of the drive means causes the ground strip 42 to come in electrical contact with the inside wall of the switch housing 14.

To accomplish the closing of the disconnect switch when the movable contact member 20 is in a retracted position, the reverse process occurs, with the rotation of the rotatable control means 46 and all movement being the exact reverse of that previously described.

While only the preferred embodiment of the invention has been shown, it should be understood that many modifications are possible without departing from the spirit and scope of the invention. For example, the movable contact member 20 and the conductor 19 may be disposed from each other at an angle greater or smaller than the 180° shown in the preferred embodiment. Further the fixed contact member 18 could have additional fixed or movable contact members attached thereto. It is also to be understood that the insulators 22, 24 may be attached to the conductors 17, 19 and to the housing 16, 14 so as to prohibit the flow of the insulating gas 26 thereby sectionalizing the bus duct system.

Thus the disclosed invention provides a simple disconnect switch particularly adapted for use in a gas-insulated system which contains a mechanism to translate a rotational movement to essentially a straight line motion thereby electrically isolating part of a gas insulated system.

I claim as my invention:

1. A gas insulated disconnect switch, comprising:
   a sealed electrically grounded chamber having an insulating gas contained therein;
   a pair of electrical conductors each entering from an end of said chamber;
   insulating support means for preventing said conductors from contacting said chamber;
   a fixed contact member, electrically attached to the first of said pair of electrical conductors in said chamber;
   a movable contact member in said chamber, said movable contact member being electrically attached to the second of said pair of electrical conductors;
   movement means in said chamber for displacing said movable member so as to make and break contact with said fixed member; and
   grounding means electrically attached to said movable member so as to make electrical contact with said ground chamber shortly after the breaking of contact between said contact members.

2. A device according to claim 1 wherein said movable member is linearly displaceable from said contact member.

3. A device according to claim 1 wherein said displacement means comprises a linkage between said movable member and a rotatable control means.

4. A device according to claim 3 wherein said linkage comprises two connected links having one end of the first link connected to said movable member and the other end connected to the end of the said second link; the other end of said second link being connected to said rotatable means.

5. A device according to claim 3 wherein said rotatable control means comprises a shaft connected at one end to said linkage, sealingly extended through the wall of said chamber connected to an insulating lever attached on the other end of said shaft.

6. A device according to claim 1 wherein said movable member and a linkage are not in electrical contact with said chamber and are supported by an insulating means.

7. A device according to claim 6 wherein said insulating means permits said movable member to be linearly displaced and is attached to said second electrical conductor in said chamber.

8. A device according to claim 1 wherein said insulating support means is sealingly placed so as to prohibit the escape of said gas.

9. A disconnect switch comprising:
an electrically grounded chamber having a pair of electrical conductors displaced therein, each entering from an end of said chamber;
insulating support means for spacing said conductors from said chamber;
a fixed contact member, electrically attached to the first of said pair of electrical conductors in said chamber;
a movable contact member in said chamber, electrically attached to the second of said pair of electrical conductors;
movement means in said chamber for displacing said movable member so as to make and break contact with said fixed member; and
grounding means electrically attached to said movable member so as to come in electrical contact with said ground chamber shortly after the breaking of contact between said contact members.

* * * * *